US011055422B2

(12) United States Patent
Floury et al.

(10) Patent No.: US 11,055,422 B2
(45) Date of Patent: Jul. 6, 2021

(54) METHOD FOR SHARING A DIGITAL IMAGE BETWEEN A FIRST USER TERMINAL AND AT LEAST ONE SECOND USER TERMINAL OVER A COMMUNICATIONS NETWORK

(71) Applicant: ORANGE, Issy-les-Moulineaux (FR)

(72) Inventors: Cedric Floury, Perros Guirec (FR); Violaine Mercier, Pleumeur Bodou (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/065,518

(22) PCT Filed: Dec. 16, 2016

(86) PCT No.: PCT/FR2016/053501
§ 371 (c)(1),
(2) Date: Jun. 22, 2018

(87) PCT Pub. No.: WO2017/109353
PCT Pub. Date: Jun. 29, 2017

(65) Prior Publication Data
US 2019/0005253 A1     Jan. 3, 2019

(30) Foreign Application Priority Data

Dec. 23, 2015 (FR) ...................................... 1563285

(51) Int. Cl.
*G06F 21/60* (2013.01)
*H04N 21/414* (2011.01)
(Continued)

(52) U.S. Cl.
CPC ........ *G06F 21/604* (2013.01); *G06F 3/04883* (2013.01); *G06F 21/6245* (2013.01);
(Continued)

(58) Field of Classification Search
CPC ............... G06F 21/604; G06F 21/6245; G06F 3/04883; H04N 1/4493
See application file for complete search history.

(56) References Cited

U.S. PATENT DOCUMENTS 8,612,854 B2 * 12/2013 Eisen ................. H04N 1/32229
715/271
10,319,345 B2 * 6/2019 Kim ...................... G06F 3/0488
(Continued)

FOREIGN PATENT DOCUMENTS

WO      2014173588 A1    10/2014

OTHER PUBLICATIONS

International Search Report dated Feb. 21, 2017, for corresponding International Application No. PCT/FR2016/053501, filed Dec. 16, 2016.
(Continued)

*Primary Examiner* — William L Bashore
*Assistant Examiner* — Gregory A DiStefano
(74) *Attorney, Agent, or Firm* — David D. Brush; Westman, Champlin & Koehler, P.A.

(57) ABSTRACT

A method for sharing a digital image between a first user terminal and at least one second user terminal over a communications network. The method includes: displaying on the second terminal a "degraded image", the degraded image being obtained from a "first image" by digital processing of the first image, the digital processing visually concealing content of the first image; and following detection of an interaction of a user with the screen of the second terminal: defining a zone of interaction of the degraded image depending on the location of the interaction on the screen; obtaining a portion of the first image corresponding to the determined zone of the degraded image; and displaying on the screen of the second terminal the portion of the
(Continued)

first image in the place of the corresponding area of the degraded image, throughout the duration of the interaction of the user with the screen.

17 Claims, 4 Drawing Sheets

(51) Int. Cl.

| | | |
|---|---|---|
| H04N 21/4788 | (2011.01) | |
| H04N 21/254 | (2011.01) | |
| H04N 21/41 | (2011.01) | |
| H04N 21/4545 | (2011.01) | |
| H04N 21/4728 | (2011.01) | |
| H04N 21/81 | (2011.01) | |
| H04N 21/454 | (2011.01) | |
| G06F 3/0488 | (2013.01) | |
| G06F 21/62 | (2013.01) | |
| H04N 1/44 | (2006.01) | |
| H04M 1/72439 | (2021.01) | |

(52) U.S. Cl.
CPC ....... *H04N 1/4493* (2013.01); *H04N 21/2541* (2013.01); *H04N 21/4126* (2013.01); *H04N 21/41407* (2013.01); *H04N 21/4542* (2013.01); *H04N 21/45455* (2013.01); *H04N 21/4728* (2013.01); *H04N 21/4788* (2013.01); *H04N 21/8153* (2013.01); *H04M 1/72439* (2021.01)

(56) References Cited

U.S. PATENT DOCUMENTS

| | | | |
|---|---|---|---|
| 2006/0268360 A1* | 11/2006 | Jones | H04N 5/23238 |
| | | | 358/448 |
| 2009/0010570 A1 | 1/2009 | Yamada et al. | |
| 2012/0250951 A1 | 10/2012 | Chen | |
| 2013/0194301 A1* | 8/2013 | Robbins | G06F 21/60 |
| | | | 345/629 |
| 2013/0254843 A1 | 9/2013 | Dagaeff et al. | |
| 2014/0177953 A1* | 6/2014 | Shevchenko | H04N 1/32309 |
| | | | 382/164 |
| 2015/0371049 A1* | 12/2015 | Xavier | G06T 11/60 |
| | | | 726/26 |

OTHER PUBLICATIONS

Written Opinion of the International Searching Authority dated Feb. 21, 2017, for corresponding International Application No. PCT/FR2016/053501, filed Dec. 16, 2016.

English translation of the Written Opinion of the International Searching Authority dated Feb. 21, 2017, for corresponding International Application No. PCT/FR2016/053501, filed Dec. 16, 2016.

* cited by examiner

METHOD FOR SHARING A DIGITAL IMAGE BETWEEN A FIRST USER TERMINAL AND AT LEAST ONE SECOND USER TERMINAL OVER A COMMUNICATIONS NETWORK

CROSS-REFERENCE TO RELATED APPLICATIONS

This Application is a Section 371 National Stage Application of International Application No. PCT/FR2016/053501, filed Dec. 16, 2016, the content of which is incorporated herein by reference in its entirety, and published as WO 2017/109353 on Jun. 29, 2017, not in English.

TECHNICAL FIELD

The invention relates generally to telecommunication terminals, and relates in particular to sharing of a digital image between a first user terminal and at least one second user terminal over a communication network. The invention is aimed, in particular, at telecommunication terminals of smartphone type in the field of mobile telephony.

PRIOR ART

Currently in the field of mobile telephony, the communication terminals of smartphone, or "intelligent telephone", type are very widespread, such as the iPhone™ marketed by the company Apple. A smartphone can be defined as being an advanced mobile telephone having the functions of a personal digital assistant, of a digital stills camera and of a laptop computer. Data input is usually done by way of a touchscreen or, more rarely of a keypad or of a stylus. According to the principle of a computer, it can execute diverse software packages/applications by virtue of an operating system specially designed for mobiles, and therefore in particular provide functionalities in addition to those of conventional mobile telephones such as: diary, television, calendar, Web browsing, consultation and sending of electronic mail, geolocation, dictaphone/recorder, calculator, compass, accelerometer, gyroscope, visual voice messaging, digital mapping etc.

Outside of the conventional communication functions such as telephony or messaging (emails, messages), the "stills camera" function is one of the currently most used functionalities in smartphones. Indeed, a terminal of smartphone type has a stills camera, also simply called a camera, designed to capture and record photographic images (stills camera mode) or video sequences (camera mode). Generally, current smartphones are equipped with two cameras, one is termed "frontal" or "front" since its objective is oriented on the same side as the screen, the other more conventional is termed "rear" its objective being oriented on the opposite side to the screen. The frontal camera typically allows a user of the terminal to take a photo of themselves, commonly called a "selfie" in English, that is to say a photographic self-portrait. The rear camera is used to take photos or videos in the same manner as a conventional digital photographic camera.

Likewise, a so-called touch tablet, electronic or digital, such as the iPAd™ marketed by the company Apple, is an ultraflat laptop computer which takes the form of a keypad-less touchscreen and which offers nearly the same functionalities as a personal computer. A tablet makes it possible to access multimedia contents such as television, Web browsing, consultation and sending of electronic mail, diary, calendar and simple office-work. It is possible to install additional applications from an on-line applications store. A touch tablet is, as it were, an intermediary between the laptop computer and the smartphone.

In this context, the users of terminals of smartphone or tablet type, or generally of laptop computers, increasingly often exchange personal photos with other users over a communication network such as a mobile network or the Internet. Typically, to this end, the user of a terminal accesses a gallery or album of digital photos of the terminal, selects a photo and sends it to one or more contacts that they choose. Generally, for the sharing of photos, the user chooses to attach the selected photo to a short message of MMS (Multimedia Messaging Service) type or else to an email, or uses a specific instant messaging application such as WhatsApp™ for smartphone, or a photo and video sharing application such as Snapchat™ designed also for smartphone.

The circulation or sharing of personal photos or digital images, generally, presents a risk from a point of view of the usage which may be made thereof by the recipient of the shared photo. Indeed, it is not rare for a personal photo or video transmitted to a third-party to then be circulated on social networks or other communication media for the purposes of being detrimental to the person with whom the photo/video originated.

To address the risk, set out hereinabove, relating to the sharing of photos, applications which propose mechanisms for securing the sharing of digital images exist. Thus the Snapchat™ application proposes a mechanism of ephemeral photos, that is to say a photograph with limited lifetime, which disappears after a few seconds when it is displayed on the recipient user's terminal.

However, this limited-lifetime photograph mechanism, although improving security in the sharing of photographs, does not eliminate the risk of misappropriated or fraudulent use of a received image. Indeed, for the few seconds during which an image is displayed on the screen of a recipient terminal, the user of the terminal can perform a screen capture and therefore record the image in their terminal or else take a photograph, with another photographic device, of the screen of their terminal on which the shared image is displayed.

The invention is aimed in particular at improving the situation set out hereinabove.

DISCLOSURE OF THE INVENTION

Thus, according to a first aspect, the invention relates to a method for sharing a digital image between a first user terminal and at least one second user terminal over a communication network. In accordance with the invention this method comprises steps of:
  display in the second terminal of a second image termed "degraded image" obtained on the basis of the digital image termed "first image" by a digital processing of the first image aimed at visually concealing its content;
  subsequent to the detection of an interaction of a user with the screen of the second terminal:
  determination of a zone of the degraded image, termed "interaction zone", as a function of the location of the interaction on the screen;
  obtaining of a part of the first image corresponding to the determined zone of the degraded image;
  display on the screen of the second terminal of the part of the first image in place of the corresponding area of the degraded image, for the duration of the user's interaction with the screen.

By virtue of this method, the content of an original digital image ("first image"), such as a photograph, displayed on the screen of the recipient terminal (second terminal) will be concealed in the transmitted image (degraded image), for example by the use of a blurring technique; and only the part of the image corresponding to the zone of the screen with which the user interacts will appear as plaintext. Consequently, even by triggering a screen capture the user will not be able to obtain a copy of the complete image.

According to an embodying characteristic of the invention, the method comprises steps of:

partitioning according to a determined template of the first image into a set of image parts, this template defining the mode of partitioning of the first image and indicating the site of each of the parts in the first image;

recording of the set of the parts of the first image with the partitioning template.

Such a partitioning template may for example be the division or segmentation of the first image lengthwise into a number N of parts of equal area. However, in other embodiments, the geometric shape and the number of parts of the first image can be determined in a random manner.

Thus, in the case of a tactile interaction between the user and the screen of the second terminal, as long as the user's finger remains resting on a zone of the screen of the terminal, therefore of the degraded image, this zone lying predominantly in one of the predefined parts of the original image (first image), only the area of the degraded image corresponding to this part of the first image will be displayed as plaintext in the terminal. The remainder of the degraded image is unchanged that is to say concealed.

According to a first embodiment of the invention, the aforementioned method comprises an initial step of transmission by the first terminal of an image transfer request destined for an image processing server on the network, this image transfer request comprising the first image and an identifier of the second terminal.

In this first embodiment, the method according to the invention comprises, before the step of display in the second terminal of the degraded image, a step of reception in the second terminal originating from the image processing server, of the degraded image as well as of the partitioning template of the first image.

Thus, the image processing corresponding to the obtaining of the degraded image according to a defined partitioning template, is performed in a server on the network, thus lightening the processings performed in the first or in the second terminal.

According to an implementation characteristic of the invention, the aforementioned method comprises steps of:

subsequent to the detection of an interaction of the user with the screen of the second terminal, determination of the location of the interaction on the screen and consequently determination of the zone of interaction of the degraded image;

comparison, using the partitioning template, of the interaction zone with the site of each of the parts in the first image, and identification of one of the parts of the first image corresponding to this interaction zone.

According to a first variant of the first embodiment set out above, the method comprises, subsequent to the aforementioned comparison step, steps of:

dispatching by the second terminal of a request for obtaining the identified part of the first image, destined for the image processing server;

subsequent to the reception by the second terminal of the identified part of the first image, replacement of the corresponding area of the degraded image with the received part of the first image.

According to this first variant, it is the image processing server which receives a request containing an identifier (for example a number) of the part of the first image corresponding to the interaction zone in the degraded image and which transmits in return to the second terminal this part to be displayed as plaintext, for example by superposition with the degraded image. This variant embodiment consequently makes it possible to lighten terminal side the processing load related to the execution of an image sharing application according to the invention.

According to a second variant of the first embodiment of the invention, the method furthermore comprises, before the step of display in the second terminal of the degraded image:

reception in the second terminal, originating from the image processing server, of the set of the parts of the first image; and the recording in a memory of the second terminal of the set of the parts of the first image;

the second terminal implementing the step of obtaining the part of the first image corresponding to the determined zone of interaction of the degraded image.

Thus, according to this second variant, after reception of the degraded image associated with the partitioning template of the original image (first image), the operations of determining a zone of interaction of the user with the screen of the second terminal, as a function of the location of the interaction on the screen, and of obtaining a part of the first image corresponding to the determined zone of the degraded image, are performed directly in the second terminal by the image sharing application. This variant embodiment, although slightly less reliable in terms of security, since all the plaintext parts of the original image are stored in the terminal, presents the advantage of not requiring exchanges between the second terminal and the server to successively obtain all the plaintext parts (not coded by blurring for example) as the user moves their finger on the screen of the terminal.

Moreover, the second variant is in particular more effective when network performance is mediocre, since the exchanges, according to the first variant, between the second terminal and the image processing server in order to successively obtain the parts of the plaintext original image may involve significant response times, and therefore degrade the quality of the service.

According to a second embodiment of the invention, the method of sharing images comprises the following steps, performed in the first terminal:

partitioning according to a determined template of the first image into a set of image parts, the template defining the mode of partitioning of the first image and indicating the site of each of the parts in the first image;

recording of the set of the parts with the partitioning template;

transmission to the second terminal of the degraded image, of the partitioning template of the first image, and of the set of the parts of the first image.

According to this second embodiment, the exchanges of images and of the additional elements (partitioning template, parts of the original image resulting from the partitioning) are performed directly between the first and the second terminal, consequently without requiring the implementation of an intermediate server.

In particular, in this second embodiment, according to a particular implementation of the method, the second terminal implements the following steps:

determination of the location of an interaction on the screen and consequently determination of the zone of interaction of the degraded image;

comparison, using the partitioning template, of the interaction zone with the site of each of the parts in the first image, and identification of one of the parts of the first image corresponding to the interaction zone;

replacement of the corresponding area of the degraded image with the identified part of the first image.

This second embodiment involves the installation of an image sharing application according to the invention, in each of the terminals involved in the sharing of images, which is more complex in terms of functionalities (coding of the original image in degraded image, and process for replacing a degraded image part with the corresponding part of the original image), but advantageously makes it possible to circumvent the use of a processing server on the network. This second embodiment is therefore more economical in terms of implementation, and its use is more suitable within the framework of a network with modest performance.

According to a particular application of the method of sharing images according to the invention, the screen of the second terminal is a touchscreen. In this case, the user interacts digitally (with a finger) with the screen, and the display on the screen of the (identified) part of the first image in place of the corresponding area of the degraded image occurs only for the duration of the user's digital interaction on the zone of interaction of the degraded image.

This application of the invention to a terminal equipped with a touchscreen is particularly suitable for a terminal of smartphone or touch tablet type.

According to another particular application of the method of sharing images according to the invention, the screen of the second terminal is equipped with a pointing device, the user interacting with the screen by means of the pointing device. In this case, the display on the screen of the (identified) part of the first image in place of the corresponding area of the degraded image occurs only while the user maintains the pointing, via said pointing device, on the zone of interaction of the degraded image.

This application of the invention is particularly suitable for a terminal of personal computer type equipped with a conventional screen and with a pointing device, such as a mouse.

Correlatively, according to a second aspect, a subject of the invention is a communication terminal comprising software means and/or hardware means configured to:

receive an image termed "degraded image" obtained on the basis of a digital image termed "first image" by a digital processing of the first image aimed at visually concealing its content;

display this degraded image on a screen of the terminal;

subsequent to the detection of an interaction of a user with the screen of the terminal:

determine a zone of the degraded image, termed "interaction zone", as a function of the location of the interaction on the screen;

obtain a part of the first image corresponding to the determined zone of the degraded image;

display on the screen of the terminal the part of the first image in place of the corresponding area of the degraded image, for the duration of the user's interaction with the screen.

According to one embodiment of the invention, such a terminal comprises means configured to receive, originating from an image processing server, the degraded image as well as a partitioning template of the first image, the template defining the mode of partitioning of the image and indicating the site of each of the parts in the first image.

According to a particular characteristic of such a terminal, it comprises means configured to:

subsequent to the detection of an interaction of the user with the screen, determine the location of the interaction on the screen and consequently determine the zone of interaction of the degraded image;

compare, using the partitioning template, the interaction zone with the site of each of the parts in the first image, and identify one of the parts of the first image corresponding to the interaction zone.

According to a particular embodiment, a communication terminal according to the invention comprises means configured to:

dispatch a request for obtaining the identified part of the first image, destined for the image processing server;

subsequent to the reception by the terminal of the identified part of the first image, replace the zone of interaction of the degraded image with the received part of the first image.

Correlatively, according to a third aspect, the invention relates to an image processing server, comprising software means and/or hardware means configured to:

receive a first image from a first communication terminal via a communication network;

obtain a second image termed "degraded image" on the basis of the first image by a digital processing of the first image aimed at visually concealing its content;

partition according to a determined template the first image into a set of image parts, the template defining the mode of partitioning of the first image and indicating the site of each of the parts in the first image;

record the set of the parts with the partitioning template;

transmit to a second communication terminal at least the degraded image and the partitioning template.

In practice, the constituent means of the invention which allow the implementation of the steps of the image sharing method briefly explained above, in a communication terminal according to the invention and in an image processing server according to the invention, are essentially implemented in software form that is to say one or more computer programs stored in one or more memories, of RAM (Random Access Memory) or ROM (Read Only Memory) type or of magnetic type (hard disk for example), and executed by a processor incorporated in the terminal or the server considered, as the case may be.

In particular, a terminal according to the invention, for example of electronic smartphone or tablet type, will be able to download a specific software application for sharing digital images, according to the invention, via an on-line applications store.

Consequently, according to a last aspect, the present invention also envisages a computer program stored on an information medium and implemented in a communication terminal or in a server on a communication network, this program comprising instructions whose execution by a processor of the terminal or of the server brings about the execution of all or some of the steps of a method for sharing digital images according to the invention.

Such a computer program according to the invention can use diverse programming languages, and comprise programs in the form of source code, object code, or of code intermediate between source code and object code, such as in a partially compiled form, or in any other desirable form.

Finally, the invention also envisages an information recording medium readable by a computer, and comprising computer program instructions. Such a recording medium can consist of any entity or device capable of storing such a program. For example, the medium can comprise a storage means, such as a ROM, for example a CD ROM or a microelectronic circuit ROM, or else a removable recording means such as a USB key or a magnetic recording means, such as a hard disk. Moreover, a software program or module according to the invention can in particular be downloaded from a network of Internet type.

The advantages afforded by a communication terminal, a server or a computer program, according to the invention, such as are briefly defined hereinabove, are identical or contribute to those mentioned above in conjunction with the method for sharing digital images, according to the invention, and will consequently not be recalled here.

BRIEF DESCRIPTION OF THE FIGURES

Other characteristics and advantages of the present invention will emerge from the detailed description which follows, which makes reference to the appended drawings in which.

DETAILED DESCRIPTION OF THE INVENTION

Figure 1:
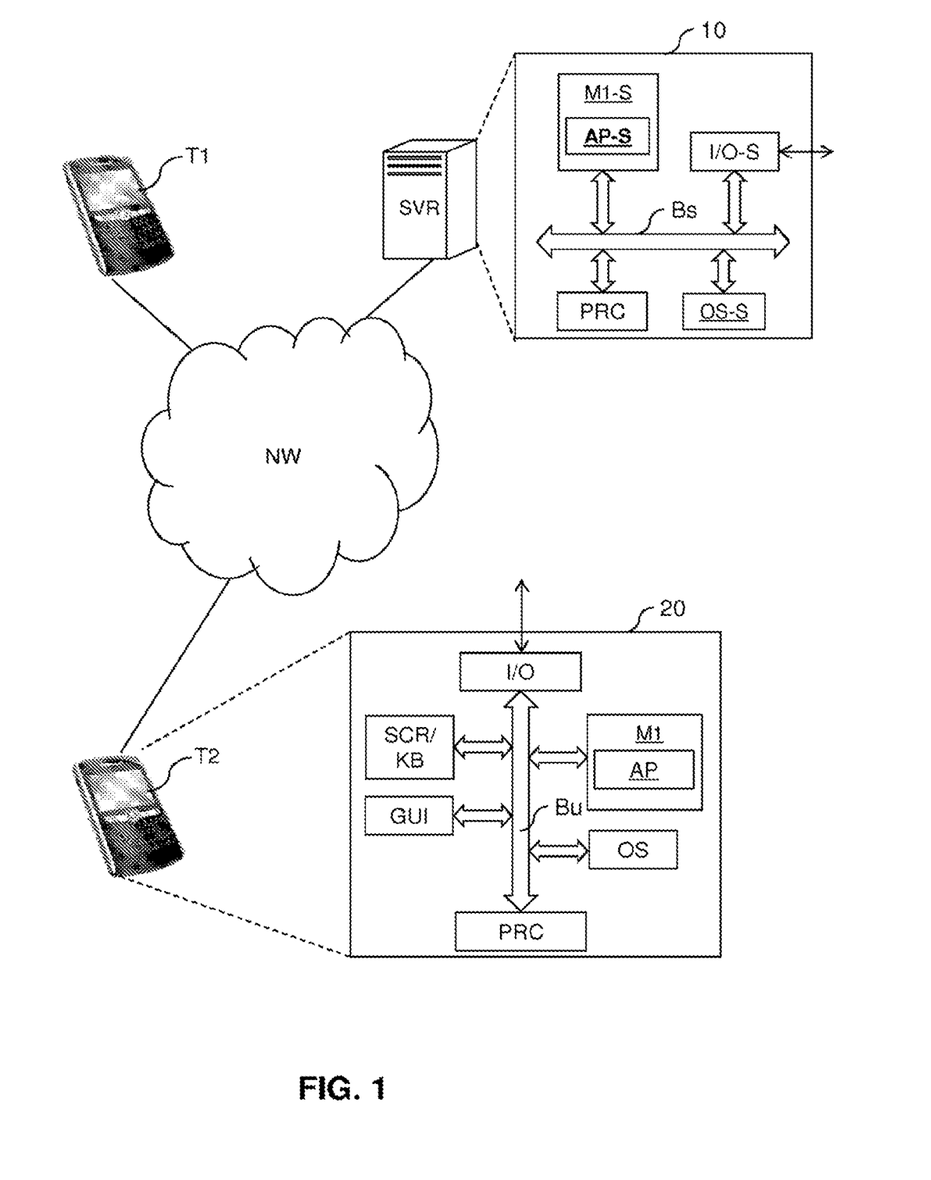
FIG. 1 illustrates a network environment in which the present invention is implemented, according to one embodiment.

FIG. 1 represents a network environment in which the present invention is implemented, according to one embodiment. The network environment represented comprises a communication network NW, a first terminal T1 of smartphone type, a second terminal T2 also of smartphone type in this example, and an image processing server SVR.

The network NW is here, according to the exemplary embodiment chosen and illustrated, a mobile network termed $3^{rd}$ generation—for example in accordance with the UMTS (Universal Mobile Telecommunications System) standard—, or with a mobile network termed $4^{th}$ generation—for example in accordance with the LTE (Long Term Evolution) standard. This network NW allows interconnection with an IP (Internet Protocol) network, not represented in the figure, and to which the server SVR in the embodiment described is connected.

The terminals T1 and T2 consist of elements arranged according to a computer hardware architecture (20) integrating a memory and have at their disposal an image sharing application according to the invention previously installed in their memory.

This architecture, denoted 20, is described here facing the terminal T2. This architecture comprises in particular a processor (PRC) and memory components of ROM and RAM type communicating by way of a set of one or more data buses (Bu);

a network communication interface module I/O, capable of establishing communication sessions according to a communication protocol such as a protocol of HTTP (HyperText Transfer Protocol) or HTTPS (HyperText Transfer Protocol Secure) type, on the network NW so as to communicate with the server SVR or with another terminal equipped with a sharing application according to the invention;

an operating system module, OS, for example the Android™ operating system from the company Google, managing the interaction between the various modules and the processor (PRC) of the terminal T1 or T2;

a display module SCR/KB associated with a keypad (tactile or mechanical) and a display screen coupled with a graphical interface module GUI (Graphical User Interface) to graphically present to the user of the terminal data relating to a set of applications, communication, and image sharing applications in particular, installed in the terminal;

a memory module M1 comprising in particular the software modules associated with a set of applications AP installed in the terminal, one being the image sharing application according to the invention, which application comprises the software components responsible respectively for implementing the method of sharing images according to the invention; the aforementioned components being controlled by the operating system OS.

In this exemplary embodiment the terminal T1 is the terminal sending a digital image to be shared with the terminal T2.

From a functional point of view, each of the terminals T1, T2 includes in particular the functional modules detailed hereinafter and grouped together in an application AP installed in memory (M1) of each terminal.

The terminal T1 comprises in particular (first embodiment set out above):

A module for selecting, from a gallery of images, an image to be shared with at least one second terminal on the network.

A module for transmitting an image transfer request destined for the image processing server SVR on the network.

According to the second embodiment set out above, the terminal T1 can also comprise:

A module for partitioning according to a determined template the first image into a set of image parts, the template defining the mode of partitioning of the first image and indicating the site of each of the parts in the first image.

A module for recording the set of the parts with the partitioning template.

A module for transmitting to a second terminal (T2) the degraded image, the partitioning template of the first image, and the set of the parts of the first image.

According to this second embodiment, the exchanges of images and of the additional elements (partitioning template, parts of the original image resulting from the partitioning) are performed directly between the terminal T1 and the terminal T2, consequently without requiring the implementation of an intermediate server SVR.

The terminal T2 comprises in particular the following functional modules:

A module for receiving originating from the image processing server SVR (first embodiment) or directly from the terminal T1 (second embodiment), a degraded image as well as the partitioning template of the original image (first image).

A module for displaying the degraded image on the screen of the terminal.

A module for detecting an interaction of a user with the screen of the terminal.

A module for determining a zone of the degraded image, termed "interaction zone", as a function of the location of an interaction of a user with the screen.

A module for obtaining a part of the first image corresponding to the determined zone of the degraded image; the module for obtaining an image part is configured in particular to determine the location of the interaction on the screen and consequently determine the zone of interaction of the degraded image, and thereafter compare, using the partitioning template, the interaction zone with the site of each of the parts in the first image, and thus identify one of the parts of the first image corresponding to this interaction zone.

A module for displaying on the screen of the terminal the identified part of the first image in place of the corresponding area of the degraded image, for the duration of the user's interaction with the screen.

According to the first embodiment set out above, in its first variant, the terminal T2 furthermore comprises:

A module for dispatching a request for obtaining the identified part of the first image, destined for the image processing server, and for receiving the identified part of the first image.

A module for replacing the corresponding area of the degraded image with the received part of the first image.

According to the second variant of the first embodiment, the aforementioned dispatching/receiving module of the terminal T2 is furthermore configured to receive, originating from the image processing server, the set of the parts of the first image; and to record in a memory (M1) of the second terminal the set of the parts of the first image. In this second variant, the obtaining of the part of the first image corresponding to the determined zone of interaction of the degraded image is implemented directly in the second terminal without calling upon the server (SVR).

The image processing server SVR is utilized only within the framework of the first embodiment set out above. The server SVR is then accessible via the network NW.

In practice, the server SVR consists of elements arranged according to a computer hardware architecture 10. This architecture comprises in particular a processor (PRC) and memory components of ROM and RAM type, communicating by way of one or more data buses (Bs). From a functional point of view the server SVR comprises the following modules:

a network communication interface module I/O-S, responsible for communicating with the network NW so as, in particular, to receive originating from the terminals of users T1, T2 requests for transferring images to be shared or requests for obtaining a shared image part (first image) subsequent to an interaction of a user with a terminal screen; in practice, according to an exemplary embodiment, the aforementioned requests use a communication protocol such as the HTTP or HTTPS protocol.

an operating system module, OS-S, managing the interaction between the various modules and the processor PRC of the server;

a memory module M1-S in which are recorded program instructions of the server application AP-S according to the invention, whose execution by the processor (PRC) brings about the implementation of the steps of the method of sharing images according to the invention, which are implemented in the server SVR.

The server SVR comprises in particular the following functional modules, within the framework of the first embodiment:

A module for receiving an image, via an image transfer request, originating from a first terminal (T1) via the network NW.

A module for obtaining or creating a second image termed "degraded image" on the basis of the first image by a digital processing of the first image aimed at visually concealing its content.

A module for partitioning according to a determined template (or partitioning model) the first image into a set of image parts, this template defining the mode of partitioning of the first image and indicating the site of each of the parts in the first image;

A module for recording the set of the parts with the partitioning template;

A module for transmitting to a second communication terminal (T2) at least the degraded image and the partitioning template.

According to the first variant, set out above, of the first embodiment, the server is configured to receive originating from terminals such as the terminal T2 requests for obtaining identified parts of a shared image ("first image") and to transmit in response to these terminals response messages containing the requested image part as plaintext.

According to the second variant, set out above, of the first embodiment, the server is configured to transmit to a second terminal such as T2, not only the degraded image and the corresponding partitioning template, but also the set of the parts of the first image. In this variant, as explained above, it is the second terminal which is responsible for obtaining a part of the original image corresponding to a determined zone of interaction of the degraded image, and to do so using the partitioning template and the set of the parts of the original image previously recorded in a directory stored in a memory of the terminal. It will be noted here that such a directory storing the set of the plaintext parts of the original image in a user terminal (T2) will be located in a non-accessible or secure memory site so that the user cannot easily access it, so as to limit the risks of detrimental or illicit use of the image (photograph for example).

Figure 2:
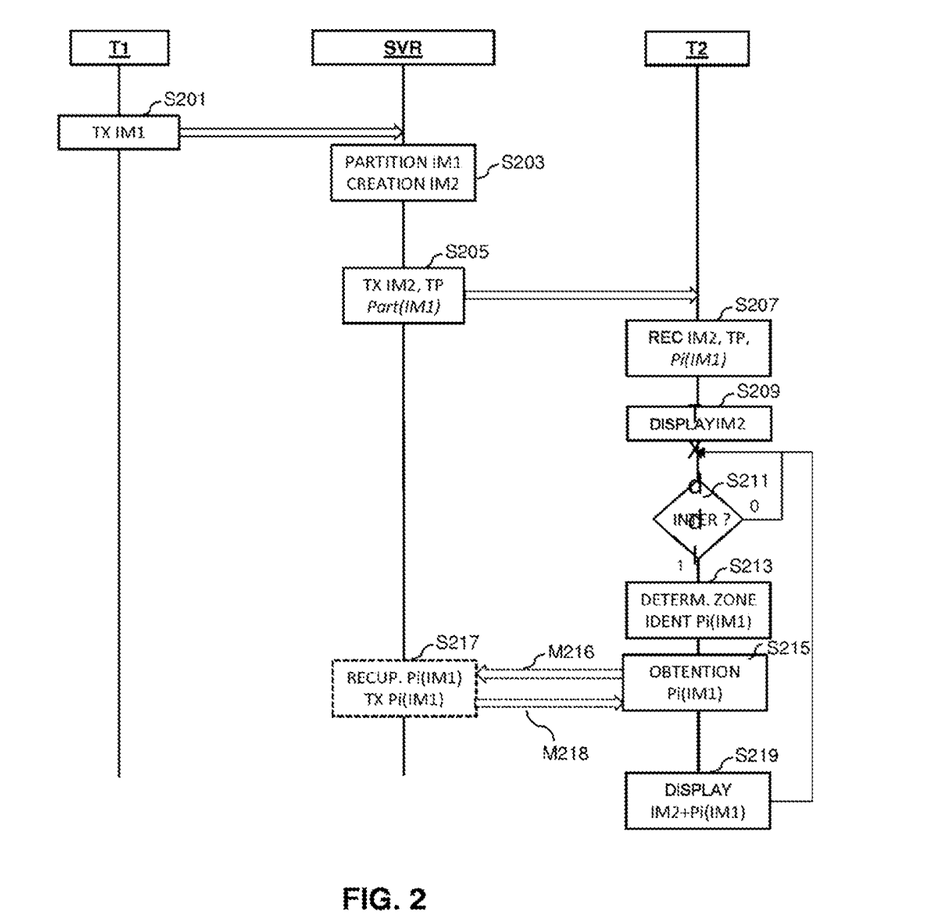
FIG. 2 represents in flowchart form the main steps of a method for sharing a digital image between a first user terminal and at least one second user terminal over a communication network, according to one embodiment of the invention.

FIG. 2 represents in flowchart form the main steps of a method for sharing a digital image between a first user terminal and at least one second user terminal over a communication network, according to one embodiment of the invention. This is the first embodiment defined above of the invention. As represented in FIG. 2 and with reference to the environment of FIG. 1, the method initially comprises the opening in the terminal T1 by the user of the terminal of an application for sharing images according to the invention, and then the selecting by the user of an image to be shared, for example a photograph, with a second user associated with the terminal T2. This original image designated by "first image" (IM1) is then transmitted (TX) in step S201 in the form of an image transfer request destined for the image processing server SVR on the network NW. The image transfer request comprises in particular the image to be shared as well as an identifier of at least one second user with which the first user wishes to share the image. This identifier may be for example a mobile telephone number associated with the second user, or an instant messaging identifier or social network identifier making it possible to reach the second user. Such a transfer request uses in a conventional manner a transport protocol such as HTTP, but can use any other protocol compatible with the type of network NW used for the exchanges between the terminals T1, T2 and the server SVR.

The server SVR receives the first image (IM1), via the transfer request, and performs in the course of step S203 a partitioning according to a determined template of the first image into a set of image parts. The partitioning template or model defines a mode of slicing the first image into a set of distinct parts and makes it possible to reference the site of each of these parts in the image.

Figure 3:
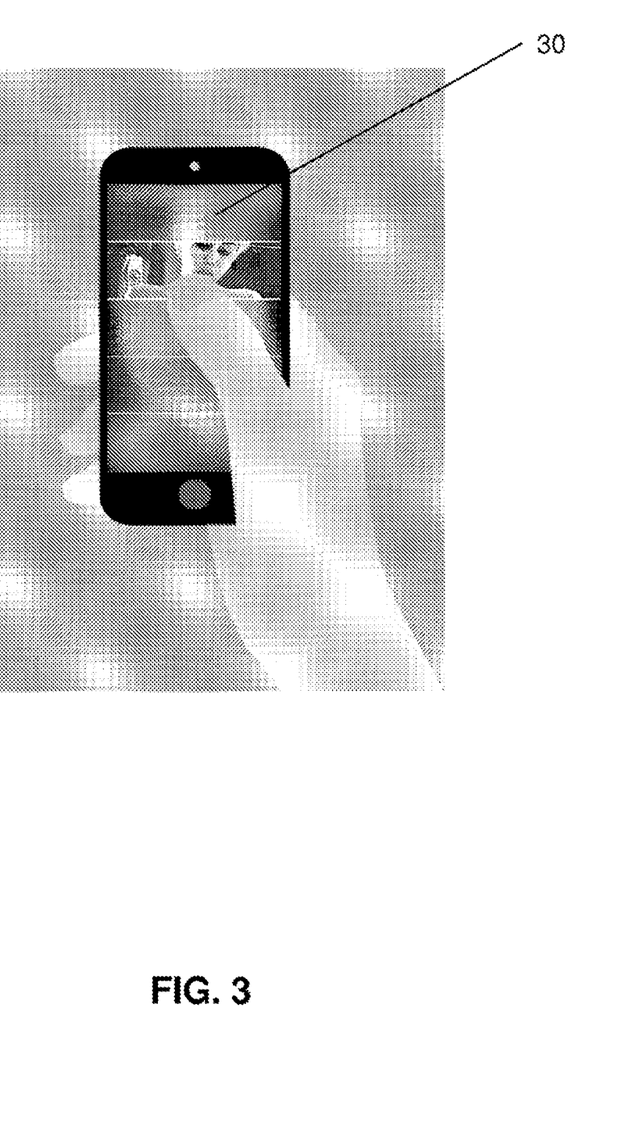
FIG. 3 illustrates the application of a particular partitioning template applied to a blurred digital photograph displayed on a screen of a terminal, with a part of the displayed photograph as plaintext subsequent to an interaction of a user with the screen.

FIG. 3 illustrates the application of a particular partitioning template applied to a blurred digital photograph displayed on a screen of a terminal, with a part of the photograph displayed as plaintext subsequent to an interaction of a user with the screen. In the example represented in FIG. 3, the image is sliced up into five distinct equal-area parts in the sense of the height of the image. The partitioning template therefore here consists of five superposed adjoining rectangles (30) whose total area is equal that of the original image. If these "rectangles" constituting a set of parts of the original image are referenced, by the numbers 1 to 5 from top to bottom of the image, it is seen in the figure that the part 2 of the image is displayed as plaintext on the screen subsequent to a tactile interaction of the user in a screen zone situated predominantly in the part 2 of the original image.

The partitioning or slicing of the original image can be performed according to other templates. Thus, it will be possible to use geometrically more advanced templates, for example parts of the image having a circular shape or parts of the image each having a distinct shape in the manner of a puzzle. It is also possible to envisage a mode of random generation of the shape of the parts of the original image.

Returning to FIG. 2, still in step S203, once the partitioning of the original image (IM1) has been performed, the set obtained of the parts of the first image (IM1) and the partitioning template used, are recorded in the server. Thereafter, there is undertaken the creation of the second image (IM2) that is to say the so-called "degraded" image, by a digital processing of the first image aimed at visually concealing its content.

Figure 4A:
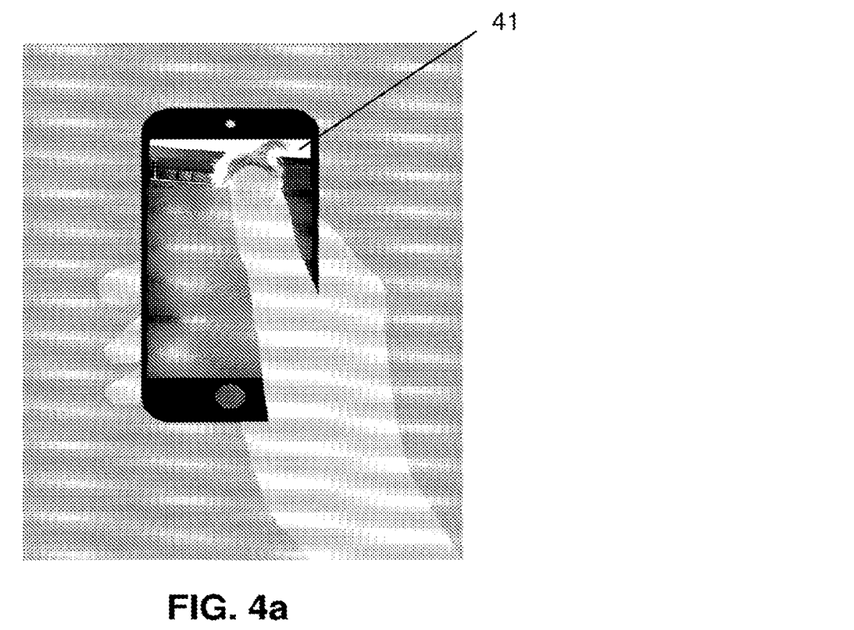
FIGS. 4a and 4b represent the terminal of FIG. 3 on the screen of which two distinct parts of the blurred image are displayed as plaintext subsequent to two successive interactions of the user with the screen of the terminal.
Figure 4B:
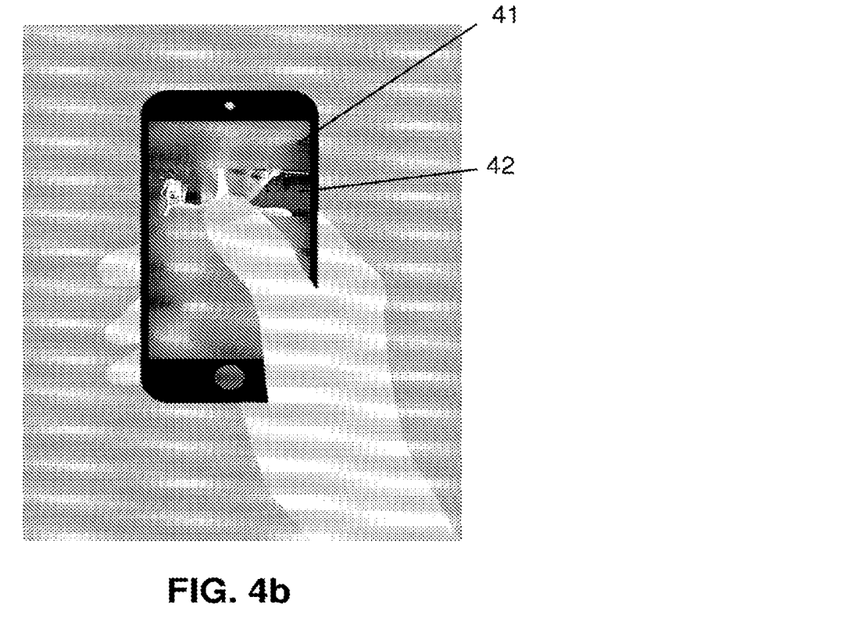

In the example described and illustrated by FIGS. 3 and 4a-4b, the digital processing aimed at concealing the content of the original image is a blurring processing. However, it is possible to use other techniques aimed at concealing the content of the original image. For example it will be possible to create a content-less "black" image and to have the content of each part defined for the original image appear as a function of the user's interaction on the screen of the terminal receiving the image (T2).

In step S205 which follows, the degraded image (IM2, second image) as well as an item of information (TP) descriptive of the partitioning template are transmitted (TX) via the network NW destined for the second terminal (T2).

As explained above, if the second variant of the first embodiment is implemented, then the set of the parts of the image Part (IM1) is also transmitted to the terminal T2.

In step S207, the terminal T2 receives and records the degraded image (IM2) as well as the associated partitioning template (TP), and receives and records, if relevant, the set of the parts of the image Part (IM1), if the first embodiment is implemented in its second variant.

In step S209, the degraded image (IM2) is displayed on the screen of the terminal T2, and subsequent to its display a process for detecting interaction of the user with the screen of the terminal T2 is executed, in the test step S211. In practice, in the exemplary embodiment described here, the screen of the second terminal is a touchscreen and consequently the user interacts with the screen by touching it.

As long as no interaction of the user with the screen is detected (S211, 0), the process remains on detection standby. When an interaction of the user is detected (S211, 1), for example if the user touches the screen, then one passes to step S213 in the course of which a zone of the degraded image, termed "interaction zone", is determined as a function of the location of this interaction on the screen of the terminal (T2).

More precisely in step S213, in the case of a touchscreen, subsequent to the detection of a tactile interaction of the user with the screen, the location of the interaction on the screen is determined for example by one or more pairs of coordinates defining a point or an area on the screen and thus constituting an interaction zone detected in the degraded image.

There is thereafter undertaken the comparison, using the partitioning template (TP) of the original image (IM1), of the detected interaction zone with the location of each of the parts (Part (IM1)) in the original image (IM1). Subsequent to this comparison, a part of the original image is identified by its reference (e.g. number) in the partitioning model (TP). It will be noted here that, in the case where the interaction zone "straddles" two distinct parts of the first image, it will then be possible to select the part of the first image whose area of intersection with the interaction zone is the largest.

Once the part Pi(IM1) of the original image has been identified, one passes to step S215 in the course of which there is undertaken in the terminal T2 the obtaining of the identified part of the original image (IM1).

If the first variant of the first embodiment is implemented, then the aforementioned obtaining step S215 is carried out by the dispatching of a request M216 by the second terminal of a request for obtaining the identified part (Pi(M1)) of the first image, destined for the image processing server. In step S217, the server receives the request message M216 asking for the identified part of the original image, recovers the requested part, and transmits it (TX) via a response message M218 to the terminal T2.

In the case where the second variant of the first embodiment is implemented, the terminal T2 has in memory the set of the parts of the original image, and consequently the obtaining of a part of the original image corresponding to a detected user-screen interaction is executed entirely in the terminal T2, without calling upon the server SVR.

Subsequent to the obtaining by the second terminal of the identified part of the original image, there is undertaken, in step S219, the replacement of the corresponding area of the degraded image with the identified part of the original image, and then the display of the resulting image "IM2+Pi(IM1)" on the screen. Within the framework of a tactile interaction of the user with the screen, the part of the original image displayed as plaintext in the degraded image is displayed only as long as the user keeps their finger stationary in contact with the screen. In practice, to replace a part (blurred or masked) of the degraded image with a corresponding plaintext part of the original image, it is possible to use for example a technique of digital overlays.

FIGS. 4a and 4b represent the terminal of FIG. 3 on the screen of which two distinct parts of the blurred image are displayed as plaintext subsequent to two successive interactions of the user with the screen of the terminal.

In FIG. 4a, the part 1 (41) of the original image is displayed as plaintext subsequent to a contact of the user's finger at the top of the screen. In FIG. 4b, subsequent to a slightly downwards sliding of the user's finger, the part 2 (42) of the original image is displayed as plaintext, while the part 1 (41) of the image became fuzzy again as soon as a movement of the user's finger was detected. In this example, by sliding their finger from top to bottom of the screen (or from bottom to top), the user will be able to see successively the content of all the parts of the original image but will not be able to see the global image as plaintext and therefore copy the original image, for example by triggering on their terminal a screen capture.

In the embodiment set forth hereinabove, the method of sharing images according to the invention is applied to images such as digital photographs, however according to other embodiments, the invention can also be applied to shared video sequences, subject to using a specific coding technique (blurring or jamming) of the video to mask its content, and to using a particular type of interaction of the user with the screen of the terminal triggering the display as plaintext of the video, on an area of the screen corresponding to this interaction.

The invention claimed is:

1. A method for sharing a digital image, termed a "first image", between a first user terminal and at least one second user terminal over a communication network, said method comprising acts of:
   receiving in the second terminal over the communication network a second image termed a "degraded image" and a partitioning template, the degraded image being obtained on the basis of said first image by a digital processing of the first image to conceal content of the first image, the second image being received in the second terminal without the first image, the first image having been partitioned before reception of the degraded image into a set of plaintext image parts, the partitioning template defining a mode of partitioning of the first image and indicating a site of each of the parts in the first image;
   displaying the degraded image on a screen of the second terminal;
   subsequent to detection of an interaction of a user with the screen of the second terminal,
   the second terminal performing:
   determining a zone of the degraded image, termed an "interaction zone", as a function of a location of the interaction on the screen;
   obtaining a part of the first image from the set of parts, which corresponds to said interaction zone, the obtaining comprising:
   identifying the part of the first image using the partitioning template;
   sending a request for obtaining the identified part over the communication network;
   receiving the identified part of the first image without receiving all of the parts of the first image over the communication network;
   subsequent to the reception of the identified part, replacing a corresponding area of the degraded image with the received part of the first image; and
   displaying on the screen of the second terminal said received part of the first image by replacing the corresponding area of the degraded image by said received part, for a duration of the user's interaction with the screen.

2. The method as claimed in claim 1, comprising an initial act of transmitting by the first terminal an image transfer request destined for an image processing server on the communication network, said image transfer request comprising said first image and an identifier of the second terminal.

3. The method as claimed in claim 1, wherein the degraded image and the partitioning template are received by the second terminal from an image processing server.

4. The method as claimed in claim 3, comprising an act of:
   comparing, using the partitioning template, said interaction zone with the site of each of the parts in the first image, and identifying one of said parts of the first image corresponding to said interaction zone.

5. The method as claimed in claim 4, comprising, subsequent to said comparing act, performing the acts of:
   sending by the second terminal the request for obtaining the identified part of the first image, destined for the image processing server;
   subsequent to the reception by the second terminal of the identified part of the first image, replacing the corresponding area of the degraded image with the received part of the first image.

6. The method as claimed in claim 1, comprising the following acts, performed in the first terminal:
   partitioning the first image according to the partitioning template into the set of image parts;
   recording the set of image parts with the partitioning template;
   transmitting to the second terminal the degraded image and the partitioning template of the first image.

7. The method as claimed in claim 6, in which the second terminal implements acts of:
   comparing, using the partitioning template, said interaction zone with the site of each of the parts in the first image, and identifying one of said parts of the first image corresponding to said interaction zone.

8. The method as claimed in claim 1, in which the screen of the second terminal is a touchscreen, the user interacting digitally with the screen, the displaying on the screen of said part of the first image in place of the corresponding area of the degraded image occurring only for the duration of the user's digital interaction on the zone of interaction of the degraded image.

9. The method as claimed in claim 1, in which the second terminal is equipped with a pointing device, the user interacting with the screen by using the pointing device, the displaying on the screen of said part of the first image in place of the corresponding area of the degraded image occurring only while the user maintains the pointing, via said pointing device, on the zone of interaction of the degraded image.

10. The method as claimed in claim 1, in which said digital processing of the first image is a blurring processing.

11. A communication terminal comprising:
    a screen;
    a processor; and
    a non-transitory computer-readable medium comprising instructions stored thereon, which when executed by the processor configure the communication terminal to perform acts comprising:
    receiving over a communication network a second image termed a "degraded image" and a partitioning template, the degraded image being obtained on the basis of a digital image termed a "first image" by a digital processing of the first image to visually conceal content of the first image, the degraded image being received in the terminal without the first image, said first image having been partitioned, before reception of the degraded image by the communication terminal, according to the partitioning template into a set of plaintext image parts, said partitioning template defining a mode of partitioning of the first image and indicating a site of each of the parts in the first image;

displaying said degraded image on the screen of the terminal;

subsequently to detecting an interaction of a user with the screen of the terminal:

determining a zone of the degraded image, termed an "interaction zone", as a function of a location of the interaction on the screen;

obtaining a plaintext image part of the first image from said set of image parts, which corresponds to said interaction zone, the obtaining comprising:

identifying the part of the first image using the partitioning template;

sending a request for obtaining the identified part over the communication network;

receiving the identified part of the first image without receiving all of the parts of the first image over the communication network;

subsequent to the reception of the identified part, replacing a corresponding area of the degraded image with the received part of the first image; and displaying on the screen of the terminal said received part of the first image by replacing the corresponding area of the degraded image by said received part, for a duration of the user's interaction with the screen.

12. The communication terminal as claimed in claim 11, wherein the communication terminal receives the degraded, and the partitioning template from an image processing server.

13. The communication terminal as claimed in claim 12, which is further configured to:

subsequent to the detection of the interaction of the user with the screen, determine the location of the interaction on the screen and consequently determine the zone of interaction of the degraded image;

compare, using the partitioning template, the interaction zone with the site of each part of the first image, and identify one of said parts of the first image corresponding to the interaction zone.

14. The communication terminal as claimed in claim 13, which is further configured to perform the acts of:

sending the request for obtaining the identified part of the first image, destined for the image processing server;

subsequent to reception by the terminal of the identified part of the first image, replacing the corresponding area of the degraded image with the received part of the first image.

15. An image processing server, comprising:
a processor; and
a non-transitory computer-readable medium comprising instructions stored thereon, which when executed by the processor configure the processing server to perform acts comprising:

receiving a first image from a first communication terminal via a communication network;

obtaining a second image termed a "degraded image" on the basis of the first image by a digital processing of the first image to visually conceal content of the first image;

partitioning said first image according to a partitioning template said into a set of plaintext image parts, said partitioning template defining a mode of partitioning of the first image and indicating a site of each part in the first image;

recording the set of the parts with the partitioning template;

transmitting to a second communication terminal at least the degraded image and the partitioning template without the first image;

subsequent to transmitting the degraded image, receiving from the second communication terminal a request for obtaining an identified part of the first image from among the set of plaintext image parts; and sending the identified part of the first image without sending all of the parts of the first image to the second communication terminal.

16. A non-transitory computer-readable medium comprising a computer program stored thereon, which when executed by a processor of a second communication terminal, configure the second terminal to share a digital image, termed a "first image", between a first user terminal and the second communication terminal over a communication network, wherein the computer program configures the second communication terminal to:

receive in the second terminal over the communication network a second image termed a "degraded image" and a partitioning template, the degraded image being obtained on the basis of said first image by a digital processing of the first image to conceal content of the first image, the second image being received in the second terminal without the first image, the first image having been partitioned before reception of the degraded image into a set of plaintext image parts, the partitioning template defining a mode of partitioning of the first image and indicating a site of each of the parts in the first image;

display the degraded image on a screen of the second terminal; and subsequent to detection of an interaction of a user with the screen of the second terminal, perform:

determining a zone of the degraded image, termed an "interaction zone", as a function of a location of the interaction on the screen;

obtaining a part of the first image from the set of parts, which corresponds to said interaction zone, the obtaining comprising:

identifying the part of the first image using the partitioning template;

sending a request for obtaining the identified part over the communication network;

receiving the identified part of the first image without receiving all of the parts of the first image over the communication network;

subsequent to the reception of the identified part, replacing a corresponding area of the degraded image with the received part of the first image; and displaying on the screen of the second terminal said received part of the first image by replacing the corresponding area of the degraded image by said received part, for a duration of the user's interaction with the screen.

17. A non-transitory computer-readable medium comprising a computer program stored thereon, which when executed by a processor of an image processing server, configure the image processing server to share a digital image, termed a "first image", between a first user terminal and a second communication terminal over a communication network, wherein the computer program configures the image processing server to:

receive the first image from the first user terminal via a communication network;

obtain a second image termed a "degraded image" on the basis of the first image by a digital processing of the first image to visually conceal content of the first image;

partition said first image according to a partitioning template into a set of plaintext image parts, said template defining a mode of partitioning of the first image and indicating a site of each part in the first image;

record the set of the parts with the partitioning template;

transmit to the second communication terminal at least the degraded image and the partitioning template without the first image;

subsequent to transmitting the degraded image, receive from the second communication terminal a request for obtaining an identified part of the first image from among the set of plaintext image parts; and send the identified part of the first image without sending all of the parts of the first image to the second communication terminal.

\* \* \* \* \*